(12) United States Patent
Singal et al.

(10) Patent No.: US 9,785,310 B2
(45) Date of Patent: Oct. 10, 2017

(54) CONTROL OF ADDITION OF REPRESENTATIONS TO AN APPLICATION LAUNCHER

(71) Applicant: Microsoft Technology Licensing, LLC, Redmond, WA (US)

(72) Inventors: Poorva Singal, Redmond, WA (US); Harnoor Singh, Seattle, WA (US); John Christopher Whytock, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 14/599,922

(22) Filed: Jan. 19, 2015

(65) Prior Publication Data

US 2016/0209993 A1    Jul. 21, 2016

(51) Int. Cl.
| | | |
|---|---|---|
| *G06F 15/00* | (2006.01) | |
| *G06F 13/00* | (2006.01) | |
| *G06F 3/0482* | (2013.01) | |
| *G06F 9/44* | (2006.01) | |
| *G06F 3/048* | (2013.01) | |
| *G06F 3/0481* | (2013.01) | |
| *G06F 9/445* | (2006.01) | |

(52) U.S. Cl.
CPC .......... *G06F 3/0482* (2013.01); *G06F 3/048* (2013.01); *G06F 3/04817* (2013.01); *G06F 9/445* (2013.01); *G06F 9/4443* (2013.01)

(58) Field of Classification Search
CPC .............................. G06F 3/0482; G06F 9/4443
USPC .................. 715/835, 780, 840, 763–765
See application file for complete search history.

(56) References Cited

U.S. PATENT DOCUMENTS

| | | | | |
|---|---|---|---|---|
| 2012/0204131 A1* | 8/2012 | Hoang | .................... | G06F 9/445 |
| | | | | 715/835 |
| 2013/0332886 A1* | 12/2013 | Cranfill | ................. | G06F 3/0482 |
| | | | | 715/835 |

OTHER PUBLICATIONS

"International Search Report and Written Opinion Issued in PCT Application No. PCT/US2016/013306", Mailed Date: Mar. 14, 2016, 12 Pages.

* cited by examiner

*Primary Examiner* — Kevin Nguyen
(74) *Attorney, Agent, or Firm* — Klarquist Sparkman, LLP

(57) ABSTRACT

Techniques to control addition of representations to an application launcher are described. In one or more implementations, an input is received by a computing device to add a representation of an application or content to the application launcher of the computing device. The application launcher has a plurality of representations of applications or content that are selectable to navigate to a user interface corresponding with a respective application or content and are assigned into respective ones of a plurality of groups that together compose a plurality of linear arrangements of the groups. A location is controlled by the computing device at which to include the added representation in the application launcher based at least in part a determination of whether one of the plurality of groups is associated with a positional tag.

18 Claims, 7 Drawing Sheets

700 ⟶

702
Receive an input to add a representation of an application or content to the application launcher, the application launcher having a plurality of representations of applications or content that are selectable to navigate to a user interface corresponding with a respective application or content

704
Control a location by the computing device at which to include the added representation in the application launcher based at least in part a determination of whether one of the plurality of groups is associated with a last group tag

706
Determine that one of the plurality of groups is associated with the last group tag and add the other representation to the determined group

708
The addition is not performed to the determined group responsive to a determination that the addition would cause the determined group to exceed a threshold size or has a name that is assigned by a user and further comprising forming a new group that is to serve as the location

710
Determine that none of the plurality of groups are associated with the last group tag and adding the other representation to one of the plurality of groups that is currently arranged at an end of the application launcher in the display area of the user interface and assign the last group tag to the one of the plurality of groups to which the other representation is added

712
Manage assignment of the last group tag such that the last group tag is cleared responsive to customization of one or more of the representations, groups, or arrangements of the application launcher

*Fig. 7*

CONTROL OF ADDITION OF REPRESENTATIONS TO AN APPLICATION LAUNCHER

BACKGROUND

The amount of applications with which a user may interact is ever increasing. For example, users traditionally shopped at "bricks and mortar" stores to purchase applications that were then loaded locally on the users' computing devices. With the advent of online application stores, the availability of applications to the user has continued to increase such that a user may include tens and even hundreds of different applications on a variety of different computing devices.

As such, techniques have been developed to aid a user in organizing access to these applications. One such technique is known as an application launcher, such as a start screen, start menu, and so on. The application launcher includes representations of applications or content (e.g., tiles, icons, and so on) that are selectable to launch execution and access to the represented applications or content.

Conventional techniques that are utilized to manage the application launchers, however, could be inefficient and lack intuitiveness. Consequently, these conventional techniques could confuse users, especially when confronted by the multitude of applications that even a casual user may include on a computing device. One such example involves conventional techniques used to add representations to the application launcher in which the added representations are difficult to locate and did not support an intuitive reflow. Consequently, the location of the added representation could change in relation to other representations due to changes in orientation of the computing device, such as to switch from a portrait to landscape mode in a user's phone and therefore reduce efficiently in locating the representation and increase frustration to a user of the device.

SUMMARY

Techniques to control addition of representations to an application launcher are described. In one or more implementations, an input is received by a computing device to add a representation of an application or content to the application launcher of the computing device. The application launcher has a plurality of representations of applications or content that are selectable to navigate to a user interface corresponding with a respective application or content. A location is controlled by the computing device at which to include the added representation in the application launcher based at least in part a determination of whether one of the plurality of groups is associated with a positional tag.

In one or more implementations, a computing device includes a processing system configured to execute one or more instructions and computer-readable storage media comprising one or more instructions that cause execution of the processing system to implement an operating system that includes an application launcher. The application launcher has a plurality of representations of applications or content that are selectable to navigate to a user interface corresponding with a respective application or content and are assigned into respective ones of a plurality of groups that together compose a plurality of linear arrangements of the groups. The operating system is configured to control a location at which to include the added representation in the application launcher based at least in part a determination of whether one of the plurality of groups is associated with a positional tag.

In one or more implementations, one or more computer-readable storage media comprise one or more instructions stored thereon that, responsive to execution by a computing device, causes the computing device to implement an operating system that includes an application launcher. The application launcher has a plurality of representations of applications or content that are selectable to navigate to a user interface corresponding with a respective application or content and are assigned into respective ones of a plurality of groups that together compose a plurality of linear arrangements of the groups. The operating system is configured to control a location by the computing device at which to include the added representation in the application launcher based at least in part a determination of whether one of the plurality of groups is associated with a positional tag. Although an application launcher is described in the following, these techniques are equally applicable to a variety of other surfaces within a user interface that are configured to include representations of applications and/or content, such as websites, subsections within a user interface of an application, a notes section, and so forth.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 7 is a flow diagram depicting a procedure in an example implementation involving control of addition of a representation to an application launcher.

DETAILED DESCRIPTION

Overview

Application launchers have been developed to assist a user in locating an application of interest, such as to launch a particular word processing program, browser, access a document, picture, music or other content, and so on. However, conventional techniques did not support a mechanism that is intuitive when adding representations to the application launcher and thus the added representation could be difficult to locate.

Application launcher representation arrangement control techniques are described. In one or more implementations, control of representations within an application is managed such that a user may efficiently locate an added representation and may do so even in situations in which the application is reflowed, such to different aspect ratios or sizes of display areas in which the application launcher is to be displayed.

For example, techniques are described in which a positional tag is assigned to a group of representations within the application launcher. The positional tag supports a variety of functionality, such as to control display of the assigned group at a particular location within a user interface, such as at a beginning, end, left, right, and so on of the application launcher, thereby supporting reflow in various layouts. Other characteristics of the representations and groups may also be tagged and thus the positional tag may be further generalized to a characteristic tag, such as to tag sizes, display characteristics, notification characteristics, reflow characteristics and animations utilized, size of groups either by display size area or number of representations, and so on.

Additionally, the positional tag is usable to indicate which group is to receive a newly added representation of an application or content. In this way, a user may quickly locate the added representation. These techniques also include control of when to add a new group and may do so in a manner that complies with an expected layout and preserves ease of finding the representation on the part of a user. Further discussion of these techniques is described in the following sections and is shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
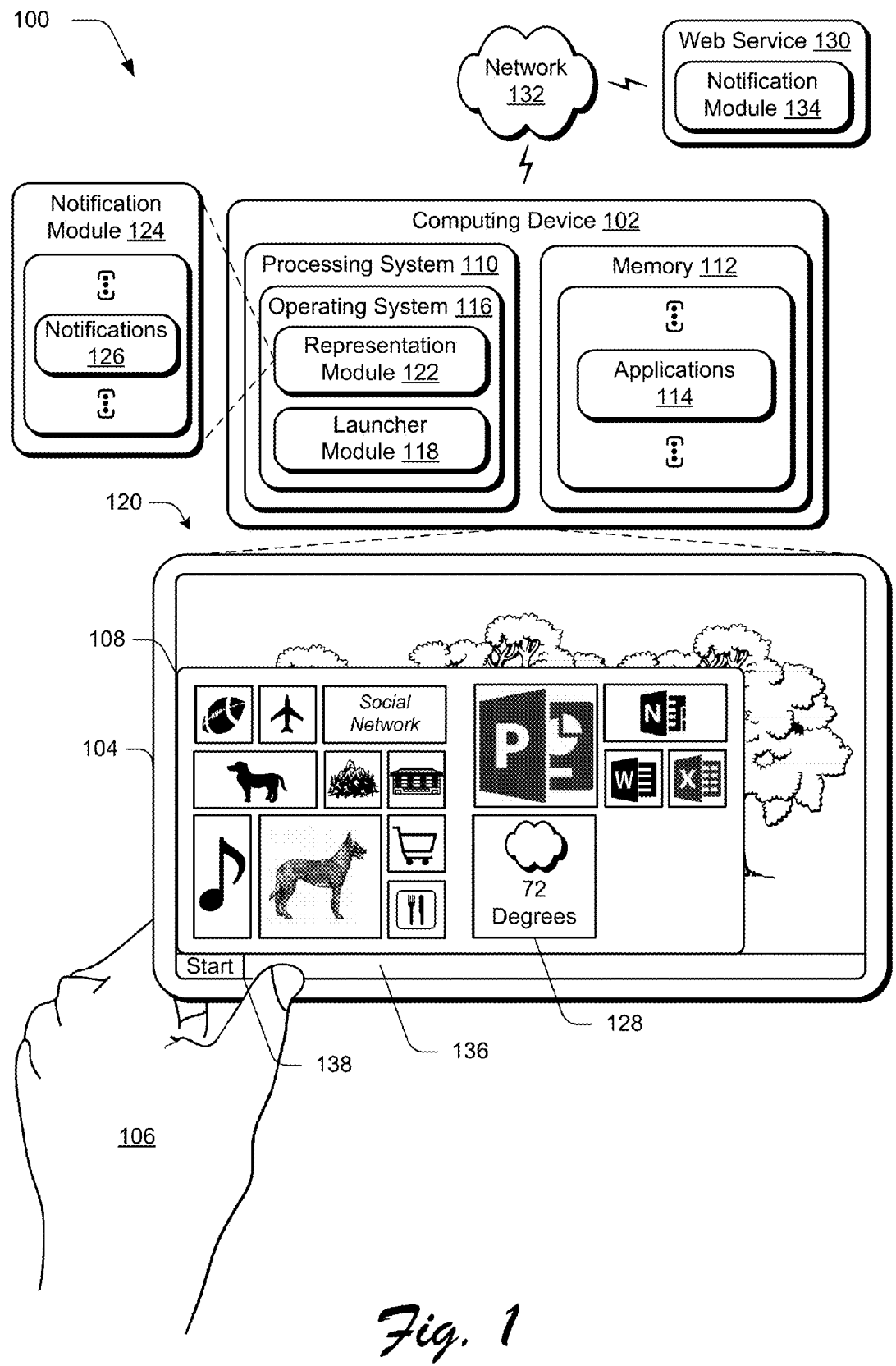
FIG. 1 depicts an environment in an example implementation that is configured to perform application launcher techniques described herein.

FIG. 1 is an illustration of an environment 100 in an example implementation that is operable to employ the application launcher techniques described herein. The illustrated environment 100 includes an example of a computing device 102, which is illustrated as a mobile computing device (e.g., tablet or mobile phone) having a housing 104 that is configured to be held by one or more hands 106 of a user. A variety of other configurations of the computing device 102 are also contemplated.

Figure 8:
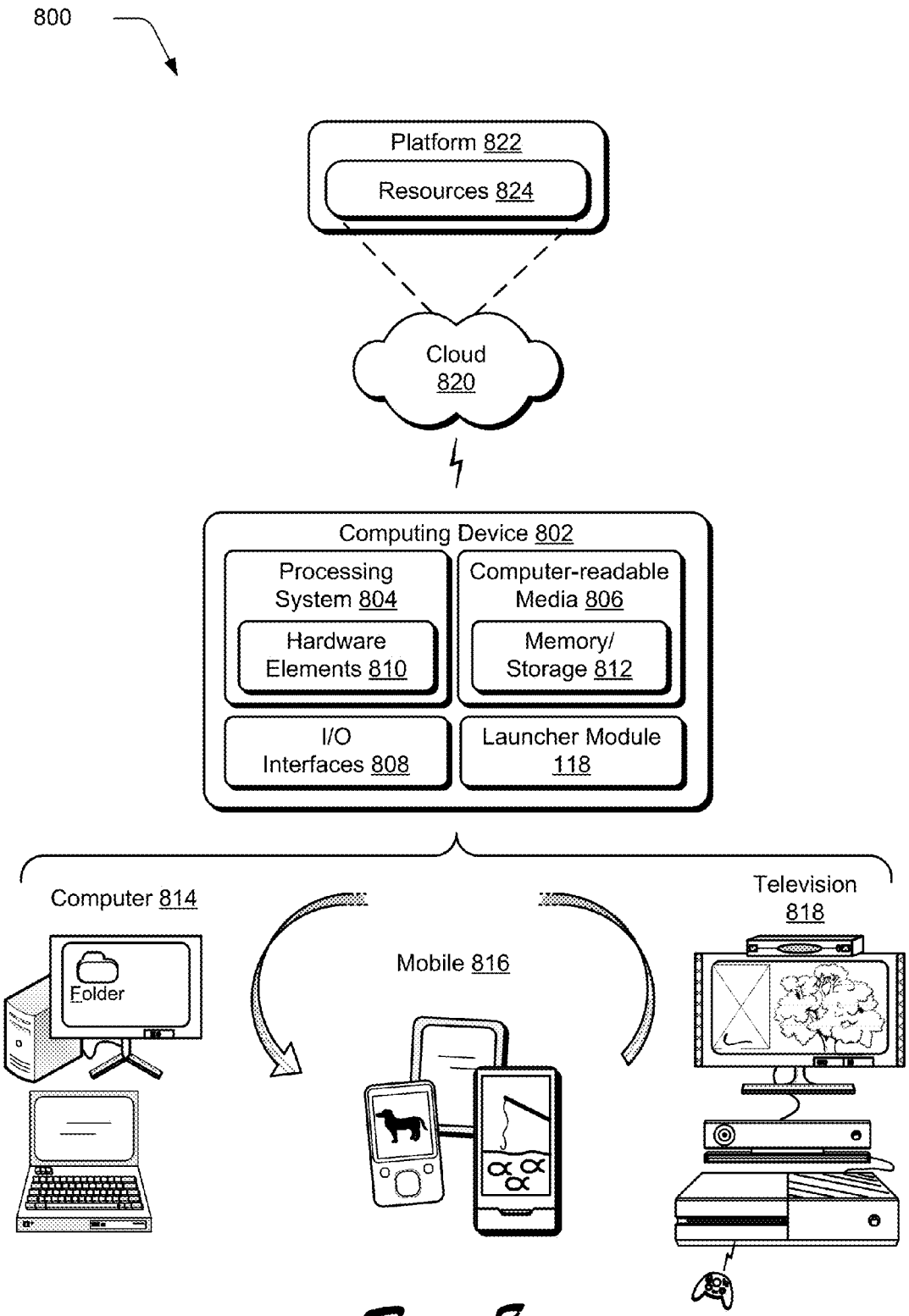
FIG. 8 illustrates various components of an example device that can be implemented as any type of computing device as described with reference to FIGS. 1-7 to implement embodiments of the techniques described herein.

For example, the computing device 102 may be configured as a traditional computer (e.g., a desktop personal computer, laptop computer, and so on), a mobile station, an entertainment appliance, a wireless phone, a tablet, a netbook, and so forth as further described in relation to FIG. 8. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including a display device 108, a processing system 110, and an example of computer-readable storage media, which in this instance is memory 112. The memory 112 is configured to maintain applications 114 that are executable by the processing system 110 to perform one or more operations.

The processing system 110 is not limited by the materials from which it is formed or the processing mechanisms employed therein. For example, the processing system 110 may be comprised of semiconductor(s) and/or transistors (e.g., electronic integrated circuits (ICs)), such as a system on a chip, processors, central processing units, processing cores, functional blocks, and so on. In such a context, executable instructions may be electronically-executable instructions. Alternatively, the mechanisms of or for processing system 110, and thus of or for a computing device, may include, but are not limited to, quantum computing, optical computing, mechanical computing (e.g., using nanotechnology), and so forth. Additionally, although a single memory 112 is shown, a wide variety of types and combinations of memory may be employed, such as random access memory (RAM), hard disk memory, removable medium memory, and other types of computer-readable storage media.

The computing device 102 is further illustrated as including an operating system 116. The operating system 116 is configured to abstract underlying functionality of the computing device 102 to applications 114 that are executable on the computing device 102. For example, the operating system 116 may abstract the processing system 110, memory 112, network, input/output, and/or display functionality of the display device 108, and so on such that the applications 114 may be written without knowing "how" this underlying functionality is implemented. The application 114, for instance, may provide data to the operating system 116 to be rendered and displayed by the display device 104 without understanding how this rendering will be performed. The operating system 116 may also represent a variety of other functionality, such as to manage a file system and user interface that is navigable by a user of the computing device 102.

The operating system 116 may be configured to process a variety of different input/output functionality supported by the computing device 102. Thus, the operating system 116 include functionality relating to recognition of inputs and/or provision of outputs by the computing device 102 as well as devices used to detect those inputs. For example, the operating system 116 may be configured to identify gestures and cause operations to be performed that correspond to the gestures, and so on. The inputs may be detected for processing by the operating system 110 in a variety of different ways.

For example, the operating system 110 may be configured to receive one or more inputs via touch interaction with a hardware device, e.g., fingers of the user's hand 106 detected using touchscreen functionality of the display device 108. Recognition of the touch inputs may be leveraged by the operating system 116 to interact with a user interface output by the computing device 102, such as to interact with a game, an application, browse the internet, change one or more settings of the computing device 102, and so forth. A variety of other hardware devices are also contemplated that do not involve touch interaction with the display device 104. Examples of such hardware devices include a cursor control device (e.g., a mouse), a remote control (e.g. a television remote control), a mobile communication device (e.g., a wireless phone configured to control one or more operations of the computing device 102), and other devices.

The operating system 116 may also represent a variety of other functionality, such as to manage a file system and a user interface that is navigable by a user of the computing device 102. An example of this is illustrated as a launcher module 118 that is representative of functionality to implement an application launcher (e.g., start screen or start menu), an example of which is illustrated as a start menu but other configurations are also contemplated, such as a start screen that consumes a majority of a display area of the display device through inclusion of representation directly "on" the user interface, e.g., on a desktop.

The application launcher 120 includes representations of a plurality of the applications 114 or content, such as icon, tiles, textual descriptions, and so on, and may be configured in a variety of ways. The application launcher 120, for instance, may be configured as a root level of a hierarchical file structure, e.g., each of the other levels are "beneath" the root level in the hierarchy. The representations shown in the illustrated example are selectable to launch a corresponding one of applications 114 for execution on the computing device 102. In this way, a user may readily navigate through a file structure and initiate execution of applications 114 of interest. Other configurations are also contemplated, examples of which are discussed in the following and shown in corresponding figures.

The operating system 116 is also illustrated as including a representation module 122. The representation module 122 is representative of functionality to manage representations of applications 114 (e.g., tiles, icons, and so on) and content consumable by the applications 114, examples of which are illustrated for the start menu. In some instance, the representations may include notifications that may be displayed as part of the representations without launching the represented applications 114. This functionality is illustrated as a notification module 124 that is configured to manage notifications 126 for inclusion as part of the representations.

For example, a representation 128 of a weather application is illustrated as including a notification that indicates a name and current weather conditions, e.g., "72°." In this way, a user may readily view information relating to the applications 114 without having to launch and navigate through each of the applications. Although representations of specific applications 114 are shown, other representations of applications are also contemplated, such as a representation of an application that references a user's involvement with a service, e.g., a friend in a social network service.

In one or more implementations, the notifications 126 may be managed without executing the corresponding applications 114. For example, the notification module 124 may receive the notifications 126 from a variety of different sources, such as from software (e.g., other applications executed by the computing device 102), from a web service 130 via a network 132, and so on. This may be performed responsive to registration of the applications 114 with a notification module 134 to specify where and how notifications are to be received. The notification module 124 may then manage how the notifications 126 are displayed as part of the representations without executing the applications 114. This may be used to improve battery life and performance of the computing device 102 by not running each of the applications 114 to output the notifications 126.

Although this discussion described incorporation of the notification module 124 at the client, functionality of the notification module 124 may be implemented in a variety of ways. For example, functionality of a notification module 124 may be incorporated by the web service 130 in whole or in part. The notification module 134, for instance, may process notifications received from other web services and manage the notifications for distribution to the computing device 102 over the network 132, e.g., through registration of the applications 114 with the notification modules 124, 134 such that the notifications 126 may be output as part of the representations without execution the represented applications 114.

Output of the application launcher 120 may be initiated in a variety of ways. In the illustrated example, for instance, a taskbar 136 (e.g., a quick launch bar) is displayed along an edge of a user interface display on the display device 108. The taskbar 136 includes representations of functionality, including a representation 138 of the application launcher 120, e.g., "Start." Selection of the representation 138 of the application launcher 120 causes the launcher module 118 to display the application launcher 120 in the user interface. The taskbar 136 may also be configured to include representations of applications 114 that are currently being executed (e.g., whether actively or in a sleep state) by the computing device 102.

As previously described, the application launcher 120 provides a user with a space in a user interface via which the user can curate desired representations of applications and content for quick access. To do so, the launcher module 118 is configured to control a location at which representations are added to the application launcher 120 (e.g., pinned) responsive to a user input or otherwise. This control is configured such that the added representation is intuitive for a user to find and also creates a visually pleasing layout without requiring user interaction to manually arrange the representations.

In this way, the launcher module 118 is configured to control the application launcher 120 in a manner that overcomes inefficiencies of conventional techniques. For example, some conventional techniques include application launchers having multiple pages in which a newly added representation is added to an end of a first page that has room. In another conventional example, a continually scrollable view is provided in which the newly added representation is included at an end of the scrolled view.

Figure 2:
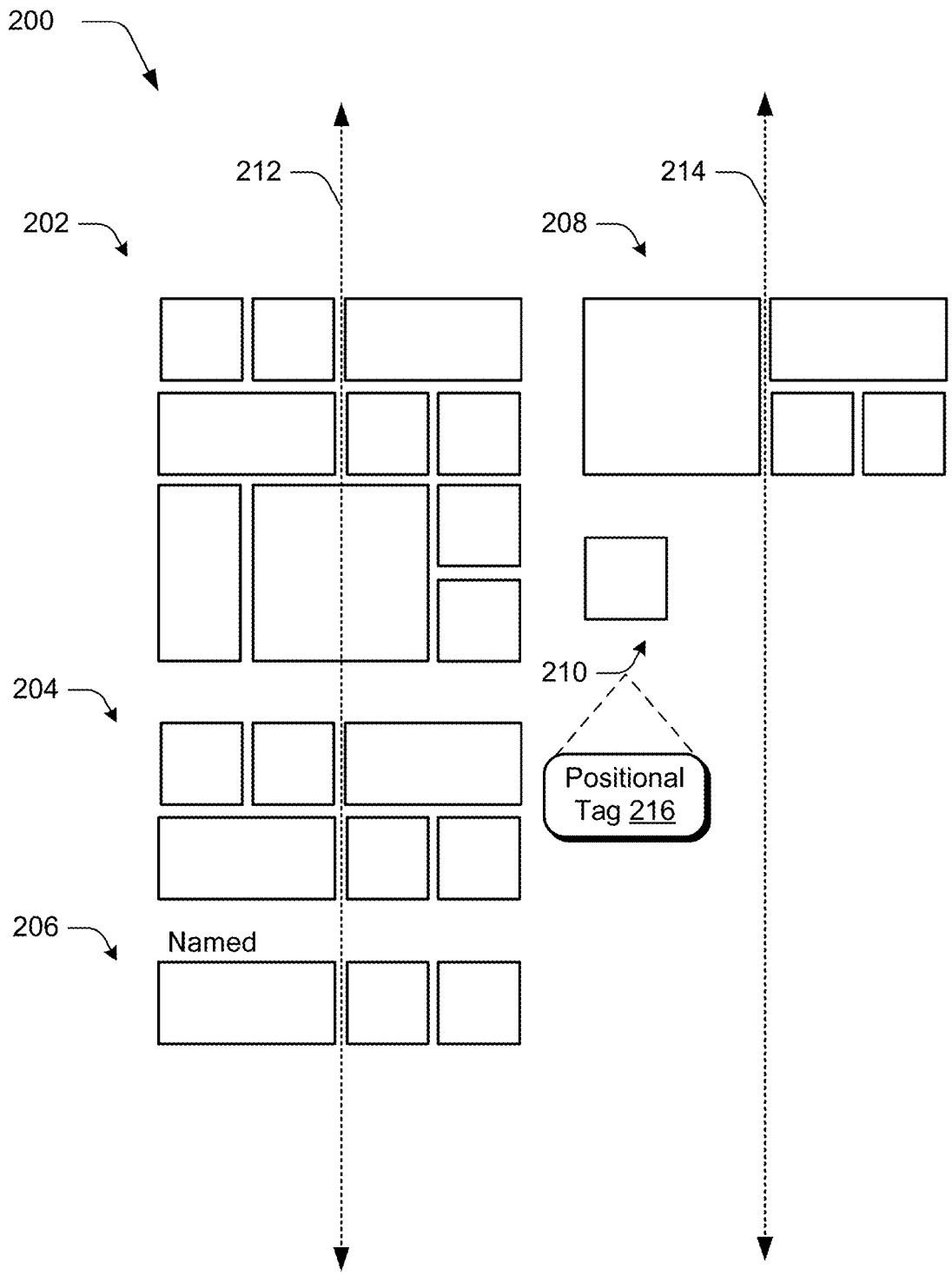
FIG. 2 depicts a user interface of an application launcher having a plurality of grouping of representations of applications and/or content in a plurality of linear arrangements.

However, techniques have been developed to support grouping of representations, which may be utilized to organize the representations, such as automatically by the launcher module 118 and/or manually by a user. As shown in FIG. 2, for instance, a user interface 200 of the application launcher 120 is illustrated having a plurality of grouping of representations of applications and/or content. The user interface 200 includes first, second, third, fourth, and fifth groups 202, 204, 206, 208, 210 of representations that are displayable simultaneously in a user interface. In one or more implementations, the groups 202, 204, 206, 208, 210 are visually differentiated from each other, such as through use of a display characteristic (e.g., color, shading), a spacing between the representations within the plurality of groups is less that a spacing between the groups as a whole as illustrated, and so forth.

Additionally, the plurality of groups 202, 204, 206, 208, 210 are arranged to compose a plurality of linear arrangements 212, 214. For example, groups 202, 204, 206 together define a first one 212 of the plurality of linear arrangements and groups 208, 210 define a second one 214 of the plurality of linear arrangements. In the illustrated example the plurality of linear arrangements 212, 214 form columns that are generally parallel to each other. An arrangement as rows is also contemplated. The linear arrangements define directions of navigation that is performable through the groups, which is vertical in this example.

The use of groups and linear arrangements, however, introduces complications. When starting a new group, for instance, a determination is to be made as to which linear arrangement 212, 214 is to include that group. To add to that complexity, the number of columns of groups can change if the user resizes a display area of the application launcher 120 or rotates the display device 108 as a whole, e.g., to change from a landscape layout of the groups as shown in FIG. 2 to a portrait layout of the groups as shown in an example 300 of a user interface of an application launcher 120 as depicted in FIG. 3.

In order to support reflow and predicable and consistent arrangement between different layouts caused by resizing, change in orientation, and so on the launcher module 118 leverages a positional tag 216 that specifies a location in which of the plurality of groups 202-210 is to receive a representation, such as a last group to such that a corresponding group is considered the last group. The launcher module 118 uses the positional tag 216 to position the assigned group 210 at an end of a user interface of the application launcher 120 in the following examples but it should be readily apparent that a wide variety of positions are contemplated.

For example, the positional tag 216 is a last group tag that is assigned to group 210 in the user interface 200 of FIG. 2, such as responsive to having a most recent addition of a representation to the group 210 in comparison with other groups 202-208, i.e., the user most recently pinned a representation to the group 210. This means that the launcher module 118 treats this group 210 as having a lowest priority of display in the application launcher 120. Accordingly, when the groups 202-210 are reflowed to a different number of linear arrangements (e.g., columns) as shown in FIG. 3, group 210 is positioned at an end of a display area of the application launcher, e.g., is "last" when scrolling through or viewing the launcher.

Figure 3:
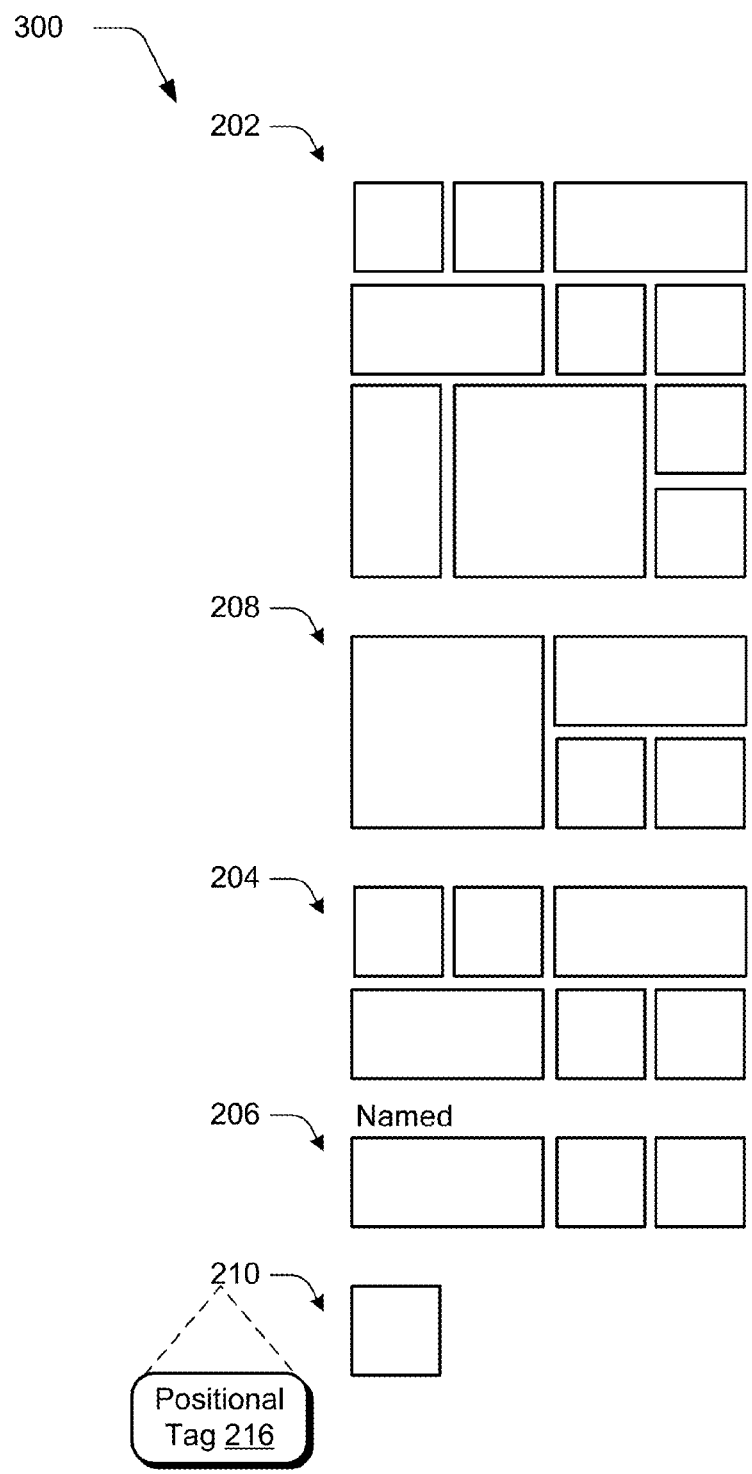
FIG. 3 depicts a user interface of an application launcher having a plurality of grouping of representations of applications and/or content of FIG. 2 rearranged into a single linear arrangement.
Figure 4:
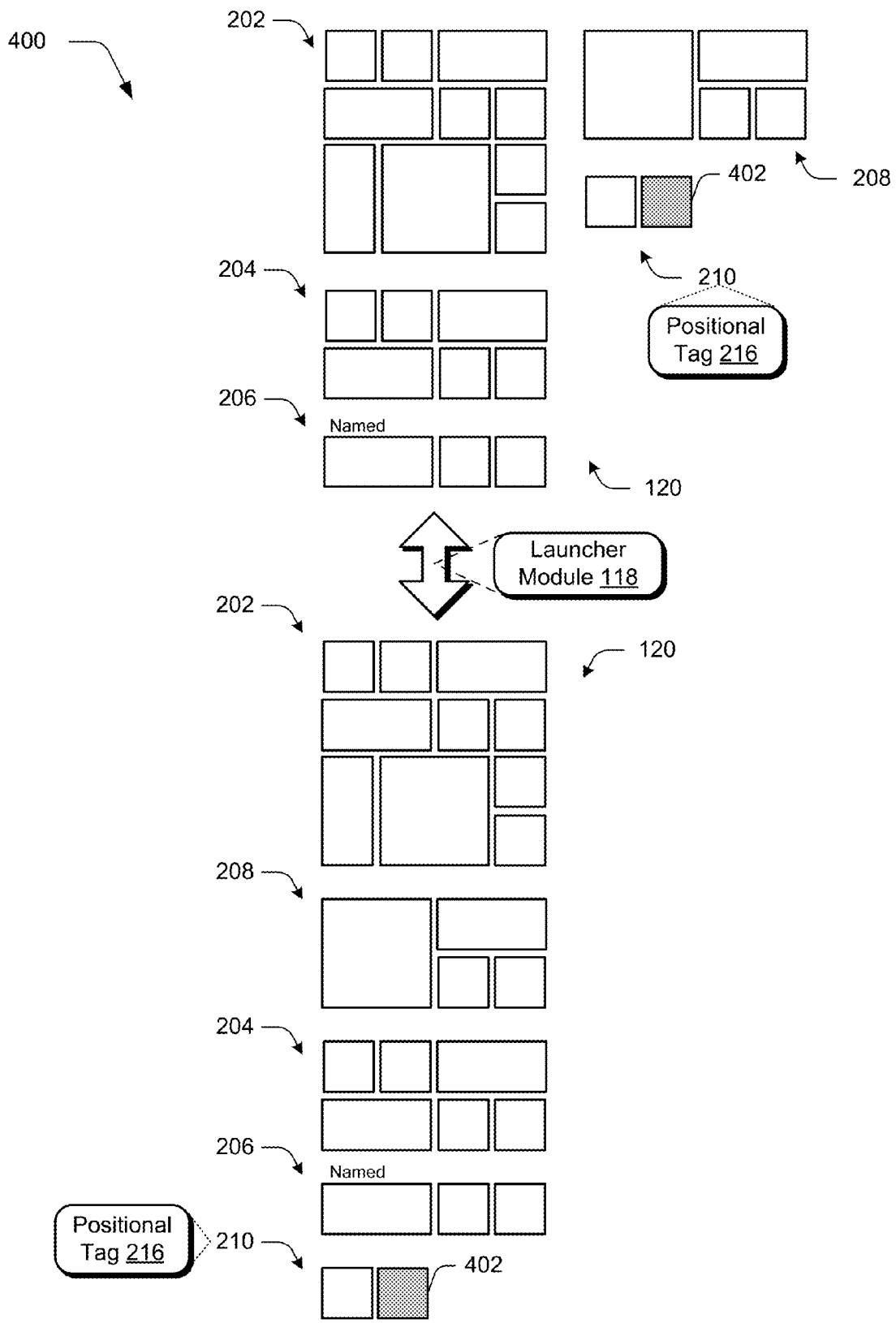
FIG. 4 depicts an example implementation in which control of addition of a representation to the user interfaces of FIGS. 2 and 3 is shown.

FIG. 4 depicts an example implementation 400 in which control of addition of a representation 402 to the user interfaces of FIGS. 2 and 3 is shown. In this example, an input is received by the launcher module 118 to add a representation 402 of an application or content to the application launcher 120.

In response, the launcher module 118 determines whether a positional tag 216 has been assigned to any of the groups 202-210. In this example, the positional tag 216 is assigned to group 210 as previously described as a last group tag. Since this group is not yet named, nor would addition of the representation 402 cause the group 210 to exceed a threshold size, e.g., along an axis of the linear arrangement 214, the representation 402 is added to this group 210. Additional considerations include whether the group has been customized by a user, e.g., a particular color, display characteristic, background, and so forth. In this way, the launcher module 118 adds the representations in a predicable manner that meets with user expectations, thereby improving efficiency of user interaction with the application launcher 120.

If the last group 210 (e.g., the group indicated by the positional tag 216 or found through heuristics as further described below) is named or if addition of the representation 402 would cause the group 210 to exceed a threshold size, a new group may be added to the application launcher 120. For example, naming of the group (e.g., association with a name that is to be displayed in conjunction with the group as shown for group 206) may indicate that a user has made an effort to categorize representations included in the group in some way. Accordingly, addition of a representation in such a group may defeat this categorization and is thus avoided in this example.

In another example, a threshold size is defined for one or more of the groups 202-210, such as for each of the groups 202-210, for use on the group to which a representation is to be added, and so forth. The threshold size is usable to prevent the launcher module 118 from overly extending a group through addition of representations and thus preserve desired visual characteristics and differentiations and therefore maintain usability and user efficiency in interaction with the groups. For example, the threshold size may be used to keep a group from getting "too long" along an axis of the linear arrangement in the illustrated example.

The launcher module 118 is further configured to control use of the positional tag 216, such as to clear the tag in a variety of different scenarios. For example, a user may customize the application launcher 120 in a manner that indicates that a current number of linear arrangements (e.g., columns or rows) in the application launcher 120 is desired. This includes resize or rearrangement of representations, removal of representations (e.g., unpin or uninstall from a start screen or menu via a representation's context menu), group rearrange, and so forth.

In one or more implementations, this does not include group or folder name or renaming, removing a representation or uninstalling an application from a surface that is different than the application launcher 120, e.g. clicking unpin from a start screen from an application list context menu. Thus, if a user rearranges a tile for example, the launcher module 118 clears the positional tag 216 because the user has customized a layout of the application launcher 120 as desired.

In another example, addition of a representation may cause creation of a new group, such as due to naming, potentially exceeding a threshold size, and so forth. Accordingly, this new group is then assigned the positional tag 216 and the positional tag 216 is removed from a previous group.

In a further example, a user provides one or more inputs to add an entire group of representations to the application launcher 120 from within an application 114, e.g., to add a group of programmable tiles. This is similar to the example above, since adding an entire group also includes formation of a new group. This new group is accordingly assigned the positional tag 216 too so that it is reflowed to the end of application launcher 120 regardless of a number of linear arrangements included in the application launcher 120.

As is apparent, this results in instances in which a positional tag 216 is not used, i.e., none of the groups 202-210 include the positional tag 216. If there is no such group, then the launcher module 118 determines the location in the application launcher 120 at which the representation is to be added using a variety of different considerations, e.g., heuristics and so on.

Figure 5:
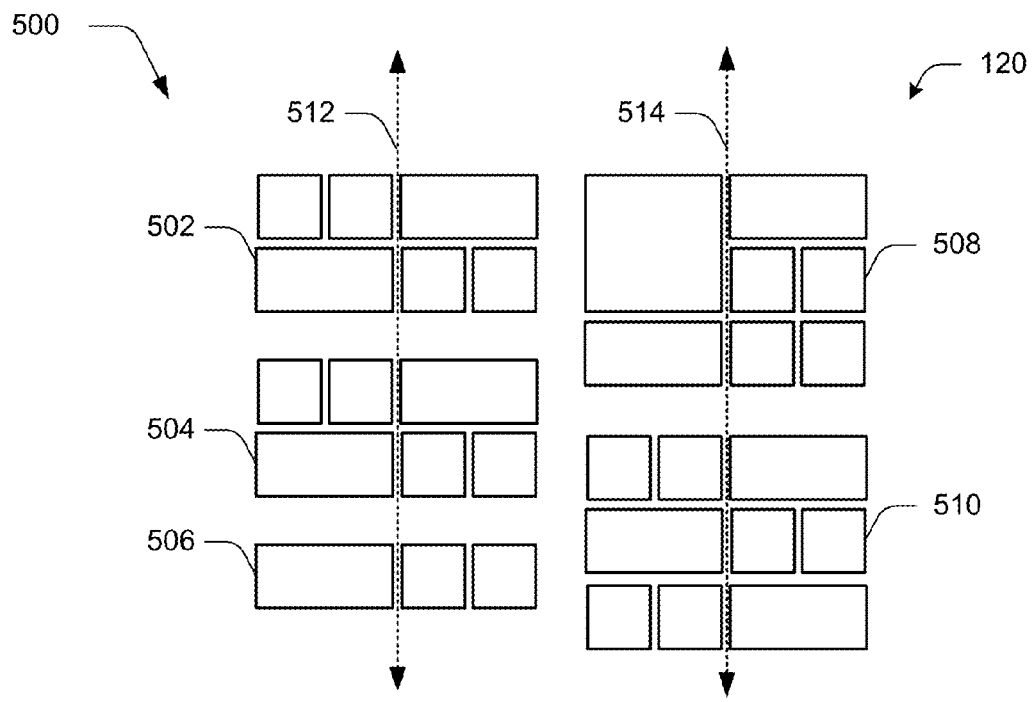
FIG. 5 depicts an example implementation in which a determination is made by a launcher module as to where to add a representation when a positional tag is not found based on length along the linear arrangement.

FIG. 5 depicts an example implementation 500 in which a determination is made by the launcher module 118 as to where to add a representation when a positional tag is not found based on length along the linear arrangement. In this example, the application launcher includes a plurality of groups 502, 504, 506, 508, 510 forming first and second linear arrangements 512, 514, e.g., columns in this example.

The launcher module 118 in this instance makes a determination of the location at which to add a representation based on which of the linear arrangements is the shortest along an axis of the arrangement. In the illustrated example, the first linear arrangement 512 of groups 502, 504, 506 is shorter than the second linear arrangement 514 of groups 508, 510. Accordingly, the representation is added to the group 506 and/or a new group is formed along the first linear arrangement 512. In this way, display area within the application launcher 120 is preserved automatically and without user intervention.

Figure 6:
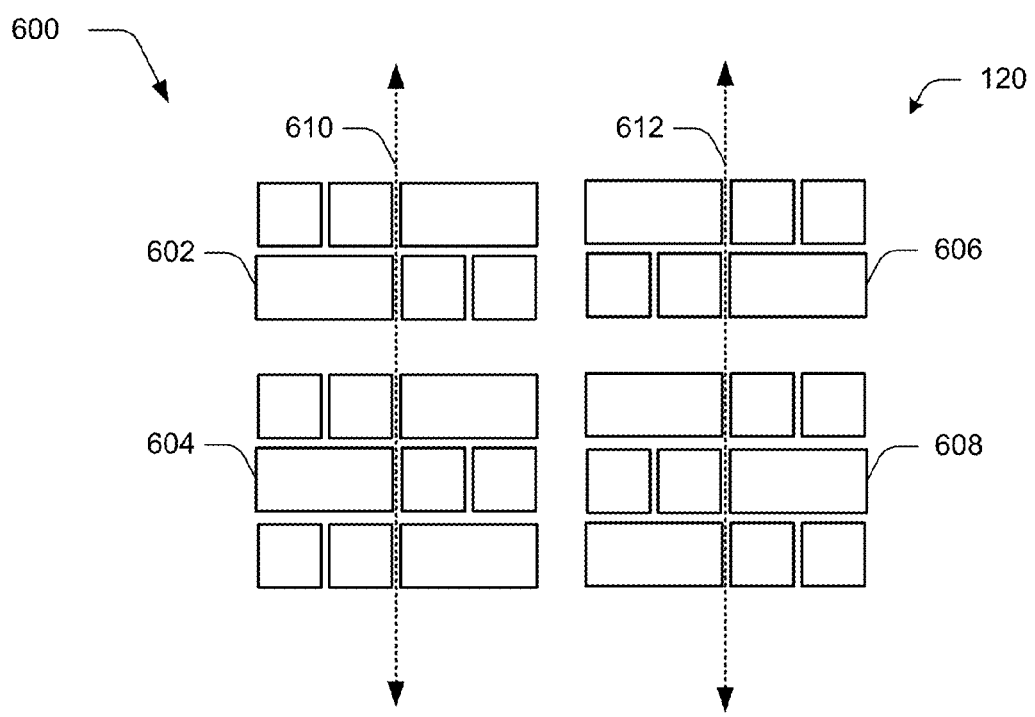
FIG. 6 depicts an example implementation in which a determination is made by a launcher module as to where to add a representation when a positional tag is not found and the linear arrangements have a matching length.

FIG. 6 depicts an example implementation 600 in which a determination is made by the launcher module 118 as to where to add a representation when a positional tag is not found and the linear arrangements have a matching length. In this example, the application launcher 120 includes groups 602, 604, 606, 608 of representations forming first and second linear arrangements 610, 612.

The launcher module 118 determines that the first and second linear arrangements 610, 612 have matching lengths, one to another, along an axis of the linear arrangements. Accordingly, the representation is added to the group 506 and/or a new group is formed at an end of the one of the linear arrangements that has a predefined relationship in relation to other ones of the plurality of linear arrangements. For example, the defined relationship that a "rightmost" or "leftmost" linear arrangement is to receive the representation, e.g., as part of an existing group or formation of a new group. Thus, the predefined relationship is usable to define what happens in an instance of a tie between the linear arrangements 610, 612.

Similar techniques are usable to specify where to add representations within groups. For example, predefined relationships may be specified to cause the representation to be added at an available display area start at a bottom, right, or left side of the group. A variety of other examples are also contemplated, further discussion of which may be found in relation to the following procedures.

Example Procedures

The following discussion describes application launcher techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment described above.

Functionality, features, and concepts described in relation to the examples of FIGS. 1-6 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

FIG. 7 depicts a procedure 700 in an example implementation involving control of addition of a representation to an application launcher. An input is received by a computing device to add a representation of an application or content to the application launcher of the computing device. The application launcher has a plurality of representations of applications or content that are selectable to navigate to a user interface corresponding with a respective application or content (block 702) and may be assigned into respective ones of a plurality of groups that together compose a plurality of linear arrangements of the groups. For example, an input may be received through a context menu, application, and so forth to "pin" a representation (e.g., tile, icon, and so forth) to an application launcher configured as a start screen, start menu, root level in a file hierarchy, and so forth.

A location is controlled by the computing device at which to include the added representation in the application launcher based at least in part a determination of whether one of the plurality of groups is associated with a positional tag (block 704). This is performable based on a variety of different considerations. For example, a determination is made that one of the plurality of groups is associated with the positional tag and the other representation is added to the determined group (block 706). In another example, the addition is not performed to the determined group responsive to a determination that the addition would cause the determined group to exceed a threshold size or has a name that is assigned by a user and rather a new group is formed that is to serve as the location (block 708). In yet another example, a determination is made that none of the plurality of groups are associated with the positional tag and the other representation is added to one of the plurality of groups that is currently arranged at an end of the application launcher in the display area of the user interface and the positional tag is assigned to the one of the plurality of groups to which the other representation is added (block 710). In a further example, assignment of the positional tag is managed such that the positional tag is cleared responsive to customization of one or more of the representations, groups, or arrangements of the application launcher (block 712). A variety of other examples are also contemplated.

Example System and Device

FIG. 8 illustrates an example system generally at 800 that includes an example computing device 802 that is representative of one or more computing systems and/or devices that may implement the various techniques described herein as illustrated through inclusion of the launcher module 118. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This functionality may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Conclusion and Example Implementations

Example implementations described herein include, but are not limited to, one or any combinations of one or more of the following examples:

In one or more examples, an input is received by a computing device to add a representation of an application or content to the application launcher of the computing device. The application launcher has a plurality of representations of applications or content that are selectable to navigate to a user interface corresponding with a respective said application or content. A location is controlled by the computing device at which to include the added representation in the application launcher based at least in part a determination of whether one of the plurality of groups is associated with a positional tag.

An example as described alone or in combination with any of the above or below examples, in which the plurality of representations are assigned into respective ones of a plurality of groups that together compose a plurality of linear arrangements of the groups An example as described alone or in combination with any of the above or below examples, in which the controlling of the location includes determining by the computing device that one of the plurality of groups is associated with the positional tag and adding the other representation to the determined group by the computing device.

An example as described alone or in combination with any of the above or below examples, in which the positional tag is assigned to the one of the plurality of groups responsive to a previous addition of one of the representations to the group.

An example as described alone or in combination with any of the above or below examples, in which the adding is not performed to the determined group responsive to a determination that the adding would cause the determined group to exceed a threshold size or has a name that is assigned by a user and further comprising forming a new group that is to serve as the location.

An example as described alone or in combination with any of the above or below examples, in which the forming of the new group is performed at an end of the one of the plurality of linear arrangements within the application launcher that is the shortest, one to another.

An example as described alone or in combination with any of the above or below examples, in which the plurality of linear arrangements within the application launcher have matching lengths and the forming of the new group is performed at an end of the one of the plurality of linear arrangements that has a predefined relationship in relation to other ones of the plurality of linear arrangements.

An example as described alone or in combination with any of the above or below examples, further assigning the positional tag to the new group.

An example as described alone or in combination with any of the above or below examples, in which the controlling of the location includes determining by the computing device that none of the plurality of groups are associated with the positional tag; and adding the other representation to one of the plurality of groups that is currently arranged at an end of the application launcher in the display area of the user interface.

An example as described alone or in combination with any of the above or below examples, further assigning the positional tag to the one of the plurality of groups to which the other representation is added.

An example as described alone or in combination with any of the above or below examples, in which the plurality of groups are visually differentiated, one from another.

An example as described alone or in combination with any of the above or below examples, in which the visual differentiation is performed such that a spacing between the representations within the plurality of groups is less that a spacing between the groups as a whole.

An example as described alone or in combination with any of the above or below examples, in which the plurality of linear arrangements are formed as rows or columns.

An example as described alone or in combination with any of the above or below examples, in which the controlling includes managing assignment of the positional tag such that the positional tag is cleared responsive to customization of one or more of the representations, groups, or arrangements of the application launcher, clearing or modifying the positional tag, and management responsive to events including customization performed by the computing device without user intervention or system upgrade An example as described alone or in combination with any of the above or below examples, in which the positional tag causes the respective said group to be arranged at a beginning, an end, or a user-specified location of the application launcher in the display area of the user interface to support reflow of the plurality of groups in relation to each other.

In one or more examples, a computing device includes a processing system configured to execute one or more instructions and computer-readable storage media comprising one or more instructions that cause execution of the processing system to implement an operating system that includes an application launcher. The application launcher has a plurality of representations of applications or content that are selectable to navigate to a user interface corresponding with a respective application or content and are assigned into respective ones of a plurality of groups that together compose a plurality of linear arrangements of the groups. The operating system is configured to control a location at which to include the added representation in the application launcher based at least in part a determination of whether one of the plurality of groups is associated with a positional tag.

An example as described alone or in combination with any of the above or below examples, in which the control of the location includes a determination that one of the plurality of groups is associated with the positional tag and adding the other representation to the determined group by the computing device.

An example as described alone or in combination with any of the above or below examples, in which the positional tag is assigned to the one of the plurality of groups responsive to a previous addition of one of the representations to the group.

In one or more examples, one or more computer-readable storage media comprise one or more instructions stored thereon that, responsive to execution by a computing device, causes the computing device to implement an operating system that includes an application launcher. The application launcher has a plurality of representations of applications or content that are selectable to navigate to a user interface corresponding with a respective application or content and are assigned into respective ones of a plurality of groups that together compose a plurality of linear arrangements of the groups. The operating system is configured to control a location by the computing device at which to include the added representation in the application launcher based at least in part a determination of whether one of the plurality of groups is associated with a positional tag.

An example as described alone or in combination with any of the above or below examples, in which the control of the location includes a determination that one of the plurality of groups is associated with the positional tag and adding the other representation to the determined group by the computing device.

An example as described alone or in combination with any of the above or below examples, in which the positional tag is assigned to the one of the plurality of groups responsive to a previous addition of one of the representations to the group.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method of causing intuitive and efficient arrangement of an application launcher of a computing device, the method comprising:
   receiving an input received by a computing device to add a representation of an application or content to the application launcher of the computing device, the application launcher having a plurality of representations of applications or content that are selectable to navigate to a user interface corresponding with a respective said application or content, and wherein the plurality of representations of applications are organized into a plurality of groups of representations for display in the application launcher; and
   controlling a location by the computing device at which to include the added representation in the application launcher based at least in part on a determination of whether one of the plurality of groups is associated with a positional tag, wherein the positional tag indicates which of the plurality of groups is to receive added representations, and wherein controlling the location comprises:
   upon determining, by the computing device, that one of the plurality of groups is associated with the positional tag, adding the representation of the application or content to the determined group that is associated with the positional tag.

2. A method as described in claim 1, wherein the positional tag is assigned to the one of the plurality of groups responsive to a previous addition of one of the representations to the group.

3. A method as described in claim 1, further comprising:
   receiving a request to add a second representation of an application or content;
   wherein the adding the second representation is not performed to the determined group responsive to a determination that the adding would cause the determined group to exceed a threshold size, has a name that is assigned by a user and further comprising forming a new group that is to serve as the location, or is customized as specified by a user.

4. A method as described in claim 3, wherein the forming of the new group is performed at an end of the one of a plurality of linear arrangements within the application launcher that is the shortest, one to another.

5. A method as described in claim 4, wherein the plurality of linear arrangements within the application launcher have matching lengths and the forming of the new group is performed at an end of the one of the plurality of linear arrangements that has a predefined relationship in relation to other ones of the plurality of linear arrangements.

6. A method as described in claim 3, further comprising assigning the positional tag to the new group.

7. A method as described in claim 4, wherein the plurality of linear arrangements are formed as rows or columns.

8. A method as described in claim 1, wherein the plurality of groups are visually differentiated, one from another.

9. A method as described in claim 8, wherein the visual differentiation is performed such that a spacing between the representations within the plurality of groups is less that a spacing between the groups as a whole.

10. A method as described in claim 1, wherein the controlling includes managing assignment of the positional tag such that the positional tag is cleared responsive to customization of one or more of the representations, groups, or arrangements of the application launcher, clearing or modifying the positional tag, and management responsive to events including customization performed by the computing device without user intervention or system upgrade.

11. A method as described in claim 1, wherein the positional tag causes the respective said group to be arranged at a beginning, an end, or a user-specified location of the application launcher in the display area of the user interface to support reflow of the plurality of groups in relation to each other.

12. A method as described in claim 1, wherein the plurality of representations are assigned into respective ones of a plurality of groups that together compose a plurality of linear arrangements of the groups.

13. A method as described in claim 1, further comprising:
receiving, from a user, a request to add a second representation of an application or content to a different group of the plurality of groups;
in response to the request to add the second representation:
moving the positional tag to the different group; and
reflowing the plurality of groups so that the different group is positioned at an end of the displayed plurality of groups.

14. A computing device comprising:
a processing system configured to execute one or more instructions; and
computer-readable storage media comprising one or more instructions that cause execution of the processing system to implement an operating system that includes an application launcher, the application launcher having a plurality of representations of applications or content that are selectable to navigate to a user interface corresponding with a respective said application or content and are assigned into respective ones of a plurality of groups of representations for display in the application launcher that together compose a plurality of linear arrangements of the groups, the operating system is configured to control a location at which to include an added representation in the application launcher based at least in part on a determination of whether one of the plurality of groups is associated with a positional tag, wherein the positional tag indicates which of the plurality of groups is to receive added representations;
wherein controlling the location comprises, upon determining that one of the plurality of groups is associated with the positional tag, adding, by the computing device, the representation of the application or content to the determined group that is associated with the positional tag.

15. A computing device as described in claim 14, wherein the positional tag is assigned to the one of the plurality of groups responsive to a previous addition of one of the representations to the group.

16. A computing device as described in claim 14, the operating system performing operations comprising:
receiving, from a user, a request to add a second representation of an application or content to a different group of the plurality of groups;
in response to the request to add the second representation:
moving the positional tag to the different group; and
reflowing the plurality of groups so that the different group is positioned at an end of the displayed plurality of groups.

17. One or more computer-readable storage media comprising one or more instructions stored thereon that, responsive to execution by a computing device, causes the computing device to implement an operating system that includes an application launcher, the application launcher having a plurality of representations of applications or content that are selectable to navigate to a user interface corresponding with a respective said application or content and are assigned into respective ones of a plurality of groups of representations for display in the application launcher that together compose a plurality of linear arrangements of the groups, the operating system is configured to control a location by the computing device at which to include an added representation in the application launcher based at least in part on a determination of whether one of the plurality of groups is associated with a positional tag, wherein the positional tag indicates which of the plurality of groups is to receive added representations;
wherein controlling the location comprises, upon determining that one of the plurality of groups is associated with the positional tag, adding, by the computing device, the representation of the application or content to the determined group that is associated with the positional tag.

18. The one or more computer-readable storage media of claim 17, the operating system performing operations comprising:
receiving, from a user, a request to add a second representation of an application or content to a different group of the plurality of groups;
in response to the request to add the second representation:
moving the positional tag to the different group; and
reflowing the plurality of groups so that the different group is positioned at an end of the displayed plurality of groups.

* * * * *